United States Patent [19]

Benzaria

[11] Patent Number: 5,866,388
[45] Date of Patent: Feb. 2, 1999

[54] CONTAINERS FOR SOLID GRANULAR MATERIALS MANUFACTURE THEREOF AND USE FOR CATALYST PURPOSES AND ADSORPTION

[76] Inventor: Jacques Raphäel Benzaria, 79, rue du Bas-Saut, 60230 Chambly, France

[21] Appl. No.: 911,354

[22] Filed: Jul. 9, 1992

Related U.S. Application Data

[62] Division of Ser. No. 790,984, Nov. 13, 1991, abandoned.

[30] Foreign Application Priority Data

Jan. 11, 1991 [FR] France ................................. 91 00306

[51] Int. Cl.$^6$ ................................................. C12N 11/08
[52] U.S. Cl. ........................................... 435/180; 568/697
[58] Field of Search .............................. 568/697; 435/180

[56] References Cited

U.S. PATENT DOCUMENTS

| | | | |
|---|---|---|---|
| 2,509,537 | 5/1950 | Stier . | |
| 3,195,988 | 7/1965 | Roberts et al. ........................ | 422/221 |
| 3,728,840 | 4/1973 | Izumi ...................................... | 53/455 |
| 3,925,959 | 12/1975 | Dykes et al. ............................ | 53/28 |
| 4,096,691 | 6/1978 | Nohira et al. .......................... | 60/295 |
| 4,211,543 | 7/1980 | Tokar et al. ............................ | 55/485 |
| 4,222,877 | 9/1980 | Silva ...................................... | 210/411 |
| 4,232,177 | 11/1980 | Smith ...................................... | 568/697 |
| 4,417,433 | 11/1983 | Mitchell ................................. | 53/451 |
| 4,443,559 | 4/1984 | Smith, Jr. .............................. | 502/527 |
| 4,732,811 | 3/1988 | Margel ................................... | 435/180 |
| 4,792,399 | 12/1988 | Haney et al. ......................... | 210/484 |
| 5,059,306 | 10/1991 | Krämer et al. . | |
| 5,073,236 | 12/1991 | Gelbein et al. ........................ | 203/29 |
| 5,076,912 | 12/1991 | Belz et al. .............................. | 210/94 |

*Primary Examiner*—Johann Richter
*Assistant Examiner*—Taofiq Solola
*Attorney, Agent, or Firm*—Millen, White, Zelano & Branigan, P.C.

[57] ABSTRACT

In the field of bringing fluids into contact with solid materials, the invention relates to the use of a container which is suitable for granular materials.

The container, of a material which is permeable to gases and liquids, is of substantially tetrahedral shape.

19 Claims, 1 Drawing Sheet

CONTAINERS FOR SOLID GRANULAR MATERIALS MANUFACTURE THEREOF AND USE FOR CATALYST PURPOSES AND ADSORPTION

This application is a division of application Ser. No. 07/790,984, filed Nov. 13, 1991.

BACKGROUND OF THE INVENTION

In the field of bringing fluids into contact with solid materials, the invention relates to the use of containers for granular materials and which are permeable to fluids and the general shape of which is substantially a tetra-hedron. The containers have a surface area:volume ratio which is particularly suitable for the use of granular material, particularly for catalysis, adsorption, ion exchange and distillation.

The use of these containers relates particularly to adsorption, distillation, ion exchange, as well as simultaneous distillation and catalysis.

Materials in the form of small, discrete particulate solids are used in many industrial applications: this is the case for instance with ion exchange, adsorption on activated charcoals, molecular screens or activated silica, or for catalytic reactions or liquids or gases which have to be in contact with these materials.

In a fixed bed, these materials offer considerable resistance to the passage of fluids, resulting in substantial losses of potential, formations of preferred routes and a more or less regular grading by order of particle size. Formations of gas pockets may occur giving rise to piston effects which lead to clogging.

Granular materials in an expanded or fluidized bed are subject to considerable abrasion and fracture, thereby losing their efficacy and giving rise to fines which have a particular tendency to clog, causing major problems.

Finally, for certain applications, there is a need for a large surface contact area for a given volume of granular material or even free space around caked granules.

Therefore, certain operations have been proposed as a way of bringing solid granular materials in contact with liquids or gases by enclosing the said materials in containers or bags which are permeable to the fluids but in which the points of fluid passage (pores or spaces, interstices or meshes, if grids are used or woven or knitted textile materials are involved) are sufficiently small to trap the finest particles of the solid materials.

To-date, the bags or containers proposed have proved to be inadequate in that they either become deformed when they are stacked or they have an insufficient surface area:volume ratio or they may be difficult or expensive to manufacture.

SUMMARY OF THE INVENTION

The primary object of the invention is the use of containers which have good mechanical properties.

Another object of the invention is the use of containers having a maximum surface area:volume ratio having regard to their geometrical form.

Another object is to use containers which have only a low level of potential loss in relation to the granular mass.

Another object is to use containers the contents of which may vary from one container to another without this resulting in mixtures of granular products.

All these uses of containers relate to the provision of contact masses for catalysis, ion exchange, adsorption, simultaneous distillation and catalysis, for which these containers are particularly suitable.

Further objects will become apparent in the light of the following:

In the field of bringing fluids into contact with solid materials, the invention concerns the use of a container for particulate or granular solid materials comprising a closed container permeable to gases or liquids and of which the pores are adapted to the granular size of the bodies with which the container is filled, so that these can be completely retained. This container comprises four substantially triangular surfaces which are adjacent three by three so that it substantially constitutes a tetrahedron.

Preferably, at least two of the opposite edges offer a rigidity greater than that of the other edges; these two opposite edges are preferably those which constituted the closure of the cylinder which gave rise to the tetrahedron.

They may comprise a plate, a reinforcement or a reinforcing rod or may more simply result from the welding or gluing of the common bases of the adjacent triangles. If one of the triangles is taller than the other, it is likewise possible to fold over the excess onto the base of the first.

It is likewise possible to reinforce a greater number of edges or even all the edges but this is not vital if the mechanical stresses remain moderate.

The term "permeable or porous material" is understood to mean any solid material which allows gases and/or liquids to pass through it but the apertures in which are of a sufficiently small size to retain the grains of solid granular material which the containers are required to hold. If the smallest grain size of the solid material is equal to (n), the dimensions of the points of passage for the fluids must, for instance, be equal to or less than 0.9n and preferably equal to or less than 0.5n. Subject to this condition, there is no limit on the size of the grains and of the pores (a pore designating any point through which a fluid can pass, whatever its size). Thus it is possible to have containers for materials in grain form which range for instance from 0.1 to 20 mm, these figures not being restrictive.

The attached drawings illustrate the container the use of which in the field of bringing fluids into contact with solid materials, is the object of the invention.

DETAILED DESCRIPTION

Figure 1:
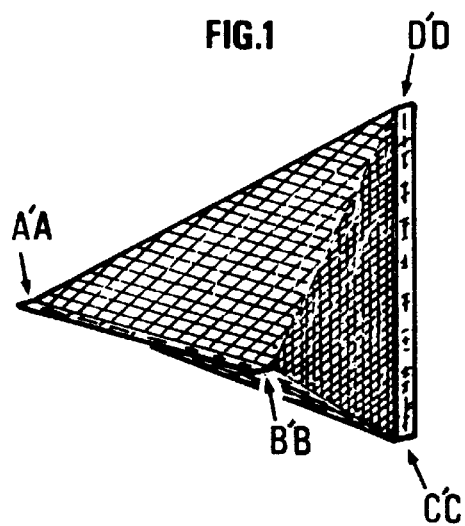
FIG. 1 is a perspective view of a container in the form of, a tetrahedron ABCD of which the four faces are of a porous material, for example a metallic cloth

In FIG. 1, there is between A and B and between C and D a bead AA'B'B resulting from the welding of two common bases of the triangles ABC and ABD on the one hand and ACD and BCD on the other.

The starting point for producing such a tetrahedral is a portion of a tube of deformable porous or permeable material, for example metallic cloth. The cross-section through this tube may be circular, oval or it may have any other form; the tube will therefore be qualified hereinafter as "cylindrical or equivalent". This definition also includes cases where the portion of the tube might not be exactly cylindrical or equivalent, that is to say the edge of the cylinder may not be of the same length at all points. This may be achieved for instance by cutting obliquely and not perpendicularly a tube of greater length when it is desired to form the portion of tube needed to produce the container.

Figure 2:
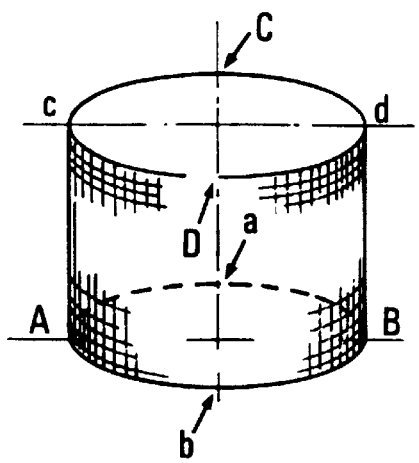
FIGS. 2, 3, and 4 are perspective side views of the stages of manufacture and filling of the container in FIG. 1.
Figure 3:
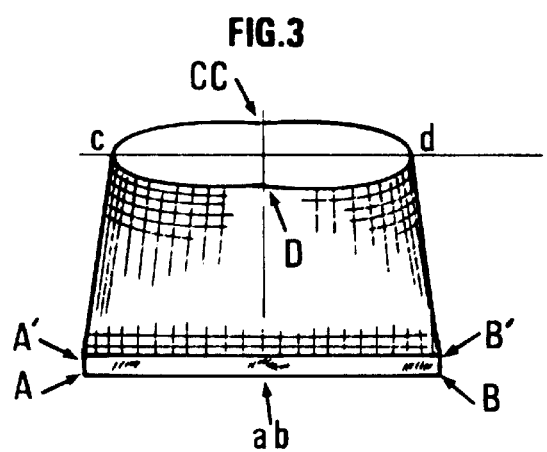

The top and bottom bases are initially open (FIG. 2). The two half circumferences (a) and (b) defined by their common ends A and B are brought towards each other until they are in contact and then these two half circumferences are fixed to each other, for instance by welding, and they then form a substantially linear bead ABB'A' (FIG. 3).

Figure 4:
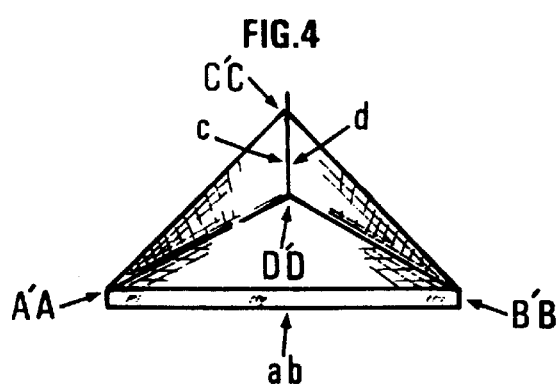

A granular material is introduced into the bag the bottom of which has been closed as explained hereinabove, and then the operation of bringing together and fixing is repeated, this time with the half circumferences (c) and (d) being defined by their common ends C and D, and therefore, in a direction which is substantially at right-angles to that of the first bringing together (ab). After fixing, for instance, by welding the half circumferences to one another, a substantially linear bead has been formed CC'D'D (FIG. 4).

While the half circumferences are being brought close together, their ends move away from one another: A from B and C and from D. The length of each bead is obviously substantially equal to the length of each half circumference which gave rise to it.

Possible materials which may be used include a woven or non-woven material, the material being for example of natural origin, such as mineral, vegetable, animal, or of synthetic origin. Materials which may be cited by way of non-limitative examples are polypropylene, polyesters, polyamides, aluminum, copper, titanium, nickel, platinum, stainless steel or a metal grid or lattice, the mesh size being sufficiently small to trap particulate solid materials. Excessively flexible materials should be avoided as they would give rise to a tetrahedral structure but one which has inadequate resistance to crushing. A certain rigidity is preferred so that the structure keeps its shape, but excessively rigid and breakable materials should be avoided as formation of the tetrahedron will otherwise be difficult or impossible.

The material should be physically and chemically inert vis-a-vis the fluid for the treatment of which it is intended.

Preferably, the finished structure will have a height calculated between a base and an opposite apex equal to 0.5 to 2 times and preferably 0.8 to 1 times the average length of the edges.

As a granular material to be introduced into the containers before they are closed in order to produce the contact masses, a solid adsorption agent can be used, for example, a molecular sieve, silica, alumina or activated charcoal; a solid catalytic agent, for example, a hydrogenation catalyst; a sulfonic resin; a catalyst for softening volatile oils; an ion exchange resin, for example, a zeolite; or at least one enzyme fixed on a solid carrier.

Obviously, granular materials are preferred which are not substantially dissolved or damaged by the fluids with which they will come in contact. The fluids which may be contacted by granular materials may be liquids and/or gases. If a plurality of fluid phases are present, they may circulate co-currently or in counter-current.

If used as a catalyst, preferably a sufficient number of tetrahedral containers will be available in the reaction zone, the containers being stacked if necessary.

During use, a certain deformation of the containers may occur, but this is preferably avoided by using cloths which have good mechanical strength and/or by reinforcing all or part of the edges. In the event of excessive crushing, the advantages of the tetrahedral structure, viz. the availability of an outer contact surface area which for equal volume is greater than that of the other principal solids, would be lost.

For certain uses, stacking will be carried out at random while for other uses, the containers will be arranged so that they occupy the least possible space. In certain situations, for example, for certain gasliquid reactions, it is particularly worthwhile maintaining the spaces.

The following are some examples of applications of the invention:

the softening of volatile oils, the catalyst being for example, a phthalocyanine over charcoal;

hydrogenation of diolefins or acetylenic substances with, for example, nickel or palladium over alumina;

softening of hard water with zeolites, ion exchange resins;

reactions catalyzed by acids, the container holding a sulfonic resin, for example;

reactions on fluids or reagents during the course of distillation, adsorption or ionic exchange;

continuous ester saponification reactions in a double jacketed column;

continuous reactions to produce ethers and esters and particularly methyl tertiobutyl ether (MTBE) and tertioamyl methyl ether (TAME);

continuous ether cracking reactions.

These reactions constitute only non-limitative examples of the use of these containers, filled with various catalysts, in the field of establishing contact between fluids and solid materials.

I claim:

1. A method of establishing contact between fluids and solid materials, said method comprising passing a fluid through a container filled with granular solid materials, said container comprising a closed casing permeable to said fluid, said casing having pores sufficiently small to retain said granular solids, said container comprising four substantially triangular faces which substantially constitute a tetrahedron, and contacting said fluid with the granular solids within said container, said container being sufficiently rigid to maintain the substantially tetrahedron shape during said contacting step, the method being conducted in a housing comprising several of said containers.

2. A method according to claim 1, in which two opposite edges of the containers comprise mechanical reinforcing means.

3. A method according to claim 2, in which the reinforcing means result from the welding of the bottom parts of two adjacent triangles of a container, said triangles having one common edge.

4. A method according to claim 1, for which the casing of the containers comprise a metal grille or lattice.

5. A method according to claim 1, in which the casing of the containers is a woven or non-woven material of synthetic or natural origin.

6. A method according to claim 1, in which the granular solid material is a catalyst.

7. A method according to claim 1, in which the granular solid material is a sulfonic resin.

8. A method according to claim 1, in which the granular solid material is an adsorption agent.

9. A method according to claim 1, in which the granular solid material is an ion exchange resin.

10. A method according to claim 1, in which the granular solid material comprises at least one enzyme fixed on a solid granular carrier.

11. A method according to claim 1, in which the casing of the container is a woven metallic material.

12. A method according to claim 1, wherein the four substantially triangular faces are permeable to said fluid and impermeable to said granular solids.

13. A method according to claim 12, wherein said fluid is a liquid.

14. A method according to claim 13, wherein said granular solids range in size from 0.1 to 20 mm.

15. A method according to claim 7, wherein said contact is conducted in a distillation column.

16. A method according to claim 1, wherein the containers have a height calculated between a base and an opposite apex equal to 0.5 to 2 times the average length of the edges of the containers.

17. A method according to claim 1, wherein the containers have a height calculated between a case and an opposite apex equal to 0.8 to 1 times the average length of the edges of the containers.

18. A method according to claim 1, wherein the containers are stacked.

19. A method according to claim 1, wherein the fluid is a gas.

* * * * *